United States Patent [19]

Jones, Jr.

[11] Patent Number: 4,800,842
[45] Date of Patent: Jan. 31, 1989

[54] DISPOSABLE PET SANITARY STATION HAVING A FIXED LOWER COMPARTMENT AND AN EXPANDABLE UPPER COMPARTMENT

[76] Inventor: George C. Jones, Jr., 2610 Austins Pl., Sugar Land, Tex. 77478

[21] Appl. No.: 3,645

[22] Filed: Jan. 15, 1987

[51] Int. Cl.$^4$ .............................................. A01K 29/00
[52] U.S. Cl. ............................................. 119/1; 119/19
[58] Field of Search ....................................... 119/1, 19

[56] References Cited

U.S. PATENT DOCUMENTS

| Re. 30,424 | 11/1980 | Heldenbrand | 119/1 |
|---|---|---|---|
| 2,741,223 | 4/1956 | Winborn, Jr. | 119/1 |
| 2,791,367 | 5/1957 | Mefford | 229/41 |
| 2,843,308 | 7/1958 | Paige | 229/37 |
| 3,032,253 | 5/1962 | Younger | 229/37 |
| 3,085,550 | 4/1963 | Crawford | 119/1 |
| 3,154,052 | 10/1964 | Sweeney | 119/1 |
| 3,195,506 | 7/1965 | Beard | 119/19 |
| 3,254,825 | 6/1966 | Nolen | 229/37 |
| 3,319,684 | 5/1967 | Calhoun | 150/8 |
| 3,377,990 | 4/1968 | Mitchell | 119/1 |
| 3,428,026 | 2/1969 | Sohmers et al. | 119/19 |
| 3,581,975 | 6/1971 | Riccio | 229/33 |
| 3,743,170 | 7/1973 | Riccio | 229/33 |
| 3,978,818 | 9/1976 | Heldenbrand | 119/1 |
| 4,014,292 | 3/1977 | Coughlin et al. | 119/1 |
| 4,161,157 | 7/1979 | Haugen | 119/1 |
| 4,164,314 | 8/1979 | Edgar | 229/33 |
| 4,171,680 | 10/1979 | Silver et al. | 119/1 |
| 4,271,787 | 6/1981 | Wellman et al. | 119/1 |
| 4,305,544 | 12/1981 | Noonan | 229/35 |
| 4,348,982 | 9/1982 | Jonathan W. Selby | 119/1 |
| 4,352,340 | 10/1982 | Strubelt | 119/1 |
| 4,377,917 | 3/1983 | Guidry | 46/11 |
| 4,406,380 | 9/1983 | Paige | 220/416 |
| 4,501,226 | 2/1985 | Bienvenu et al. | 119/1 |
| 4,541,360 | 9/1985 | Higgins et al. | 119/1 |
| 4,548,160 | 10/1985 | Feitelson | 119/1 |

Primary Examiner—John J. Wilson
Attorney, Agent, or Firm—Pravel, Gambrell, Hewitt, Kimball & Krieger

[57] ABSTRACT

A disposable pet sanitary station having a fixed lower compartment and an expandable upper compartment. The lower compartment has a bottom and four sides and can be packaged with absorbable materials. The upper compartment has a top and three foldable extensions that form a cover for the sanitary station during use. In a preferred embodiment, each folding extension has a horizontal fold midway of its height, and alternate folding extensions have two diagonal folds.

2 Claims, 2 Drawing Sheets

DISPOSABLE PET SANITARY STATION HAVING A FIXED LOWER COMPARTMENT AND AN EXPANDABLE UPPER COMPARTMENT

FIELD OF THE INVENTION

This invention relates generally to disposable pet sanitary stations, and more specifically to such sanitary stations which can hold absorbable materials while in a closed position and expand to an open position.

BACKGROUND

Packaging of absorbable materials in disposable boxes for use as pet sanitary stations is known. Ideally, the package serves the multiple purposes of transporting the material to the marketplace, holding the material during use, and disposing of the used material. For example, U.S. Pat. Nos. 3,154,052 and 3,743,170 describe how to package absorbable materials in foldable boxes that can be opened to form trays that are useful as a sanitary station for pets, and then closed to dispose of the used material. A disadvantage of these folding trays is that the absorbable material is not covered when the tray is open, therefore, the material remains visible during use and odors can readily escape. Although a separate cover can be mounted on the tray during use, it would be more convenient for pet owners that the package expand to form a covered tray. U.S. Pat. No. 3,085,550 illustrates a covered pet sanitary station which is not expandable. This sanitary station has the benefit of reducing odors but is too bulky for use as a disposable sanitary station.

SUMMARY OF THE INVENTION

The present invention is a disposable pet sanitary station having a fixed lower compartment for holding absorbable materials and an expandable upper compartment which has three sides. The disposable sanitary station can be generally described as having a bottom and four sides that form the lower compartment, and a top and three folding extensions that form the upper compartment.

In a preferred embodiment, two opposing folding extensions have only a horizontal fold midway of their height, and the third folding extension has a horizontal fold midway of its height and two diagonal folds.

DETAILED DESCRIPTION OF THE INVENTION

Figure 1:
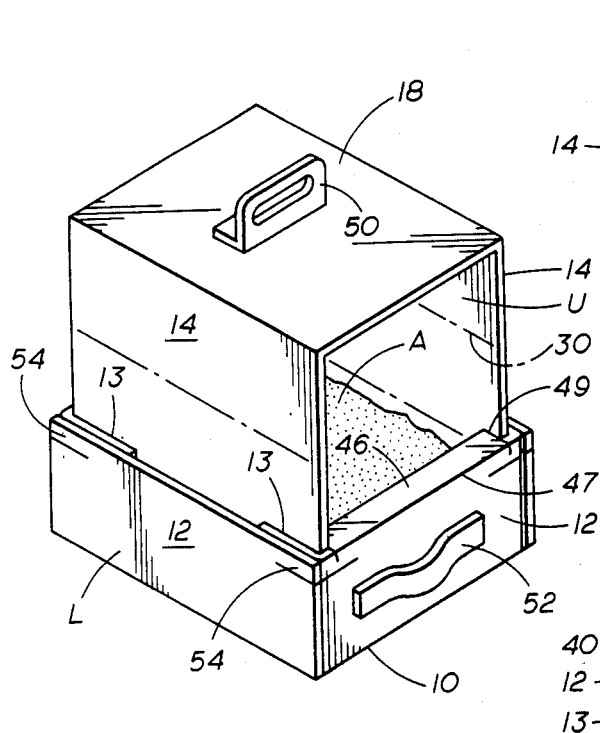
FIG. 1 shows a preferred disposable pet sanitary station of the present invention having a fixed lower compartment for packaging absorbable materials and an expandable upper compartment.
Figure 2:
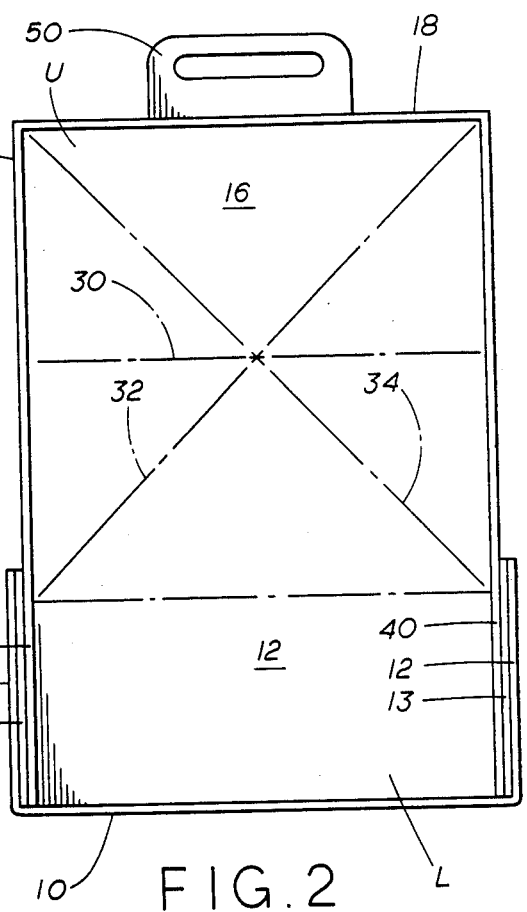
FIG. 2 is a cross-sectional view of the disposable box of FIG. 16.

A preferred embodiment of Applicant's disposable pet sanitary station is shown in FIGS. 1-6. The sanitary station has a fixed lower compartment L for containing an absorbable material, and an upper compartment U which serves as a cover for the sanitary station while in use. The lower compartment L of the sanitary station is formed from a piece of box material having a bottom 10 and four sides 12 (See FIG. 6). The sides 12 of the lower compartment L have connecting flaps 13 for connecting adjacent sides 12 with glue or similar fastening means.

The box material can be any conventional material such as cardboard which is foldable. The material may be treated or lined to resist moisture depending on the specific material.

The upper compartment U is formed from a piece of box material having three folding extensions 14 and 16 and a top 18. (See FIG. 5). All three folding extensions 14 and 16 have a horizontal fold 30 midway of their height, and the center folding extension 16 has two diagonal folds 32 and 34. Alternatively (not shown), only the two opposing folding extensions 14 could have the two diagonal folds 32 and 34. Both of these embodiments can still be described as only alternate folding extension (14 or 16) having the two diagonal folds 32 and 34.

Each folding extension 14 and 16 has a flap 40 for joining the upper compartment U to the lower compartment L with glue or similar fastening means.

The top 18 is connected by a fold 42 directly to the folding extension 16 having the diagonal folds 32 and 34, and is connected to the other folding extensions 14 by glue, tape or similar fastening means.

Figure 3:
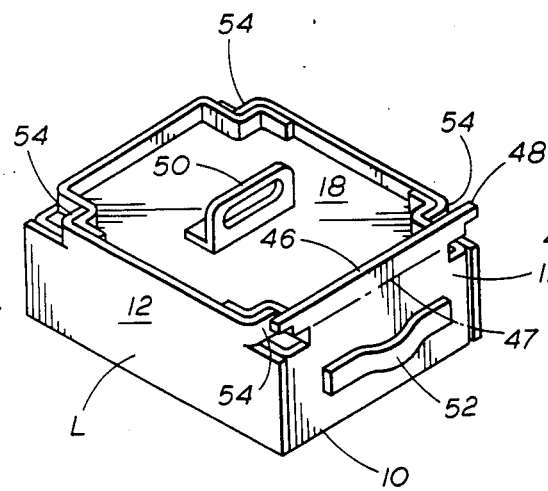
FIG. 3 shows the disposable box of FIG. 1 in a closed position.
Figure 4:
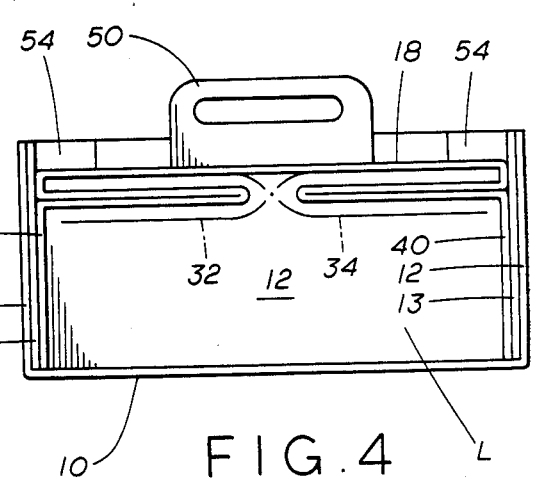
FIG. 4 is a cross-sectional view of the disposable box of FIG. 3.
Figure 5:
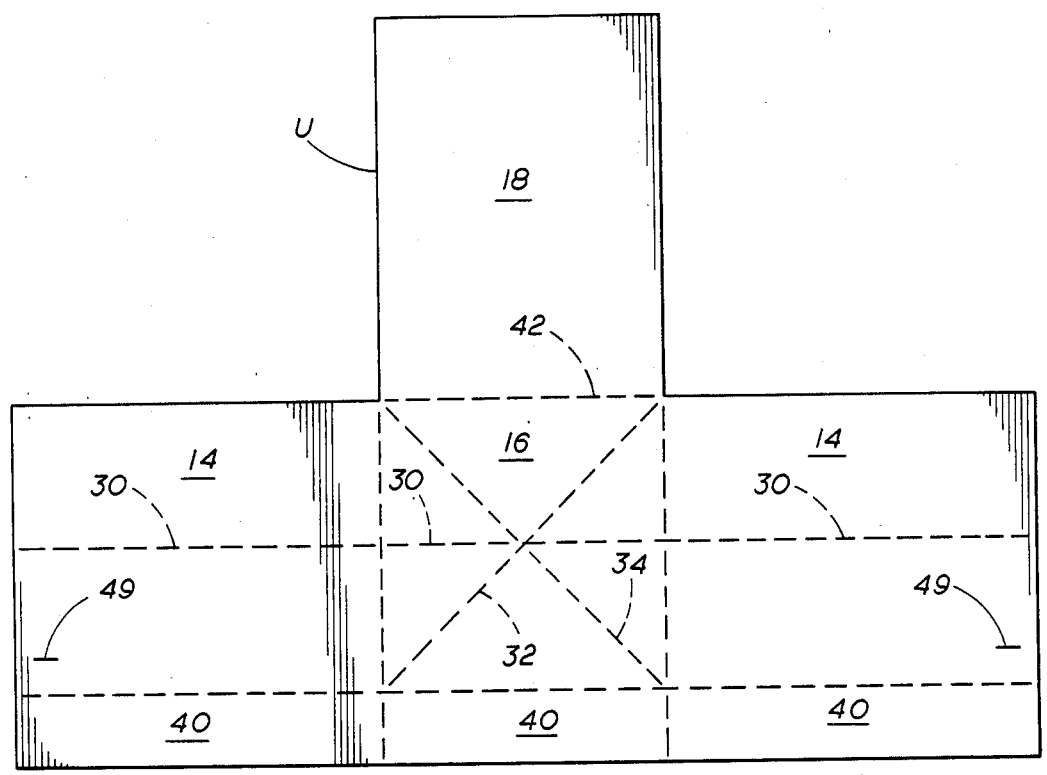
FIG. 5 shows the cuts and folds for forming the expandable upper compartment for the disposable box of FIG. 1 from a piece of box material.
Figure 6:
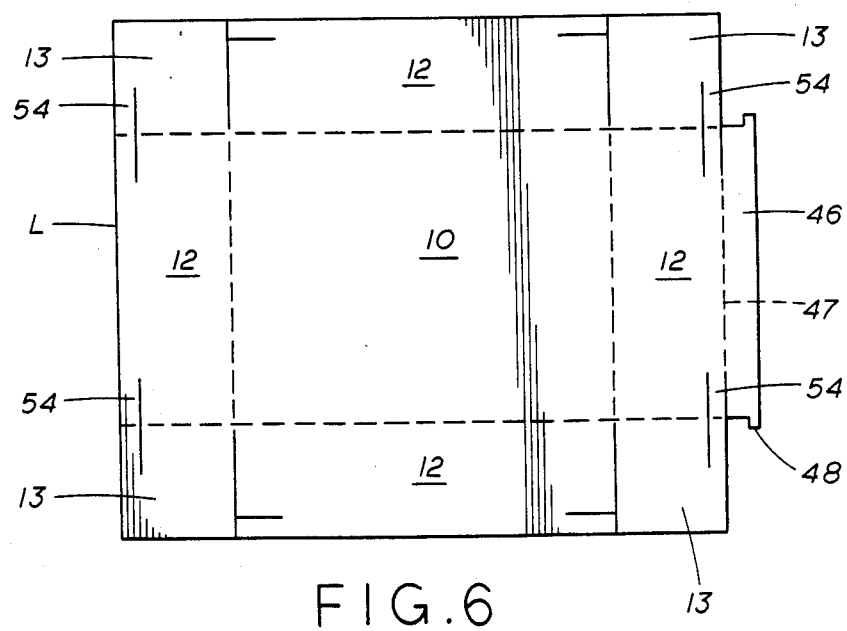
FIG. 6 shows the cuts and folds for forming the fixed lower compartment for the disposable box of FIG. 1 from a piece of box material.

Referring to FIGS. 1 and 3, an optional support flap 46 is connected by a fold 47 to the side 12 of the lower compartment L that is opposite of the center folding extension 16. When the box is in the open position as shown in FIG. 1, the support flap 46 is placed between the opposing folding extensions 14 to help retain these extensions 14 in the open position if additional support is desired. The optional support flap 46 also helps retain the absorbable material in the lower compartment L during use. The support flap 46 can be retained in place by inserting tabs 48 on the support flap 46 into holes 49 in the folding extensions 14.

For convenience, the sanitary station has a handle 50 connected to the top 18 of the upper compartment U with glue or similar fastening means. The handle 50 is useful for opening the upper compartment U or for carrying the sanitary station while in the open position. A second handle 52 is connected to one of the sides 12 and is useful for carrying the sanitary station when in the closed position.

Referring to FIGS. 1 and 3, the upper compartment U is preferably secured in a closed position by cutting the upper corners of the sides 12 of the lower compartment L to form retaining strips 54. The retaining strips 54 can be pushed inward as shown in FIG. 3 to cover the top 18 of the upper compartment U when in the closed position. Alternatively, the retaining strips 54 can be replaced by other fastening means such as string ties.

The sanitary station is preferably marketed in a closed position with a pre-measured amount of an absorbable material, such as ground clay, in the lower compartment L. The sanitary station is preferably maintained in the initial closed position by tape, string ties, plastic wrapping, or similar fastening means without reliance upon or even use of the retaining strips 54. The pet owner could then open the sanitary station for use and discard any extraneous packaging material. After opening, the upper compartment U of the sanitary station is expanded by pulling on the top handle 50. If present, the support flap 46 can be inserted between the folding extensions 14 after opening and removed prior to closing. The sanitary station is closed by pushing down on the top 18 and securing the top 18 with the retaining strips 54 without the need for other fastening means. Thus, the pet owner avoids direct contact with the absorbable material.

The foregoing disclosure and description of the invention are illustrative and explanatory thereof, and various changes in the size, shape, and materials, as well as in the details of the illustrated construction, may be made without departing from the spirit of the invention.

What is claimed is:

1. A pet sanitary station having a fixed lower compartment and an expandable upper compartment, comprising:
    a rectangular bottom panel and four sides extending vertically from the bottom panel that form a lower rectangular compartment;
    a rigid rectangular horizontal top panel and three contiguous rigid vertical rectangular folding wall panels, connected along their lower horizontal edges to three sides of the lower compartment at a height below the top edges of three sides of the lower compartment, that an upper compartment which can be folded, storing the top panel and folding wall panels inside the lower compartment;
    wherein the folding wall panels form three vertical sides of the upper rectangular compartment by being continuously joined to each other, each of two vertical edges of one wall panel being joined to a vertical edge of each of the other two wall panels, and by being continuously joined to three edges of the top panel along their upper horizontal edges;
    wherein the fourth side of the upper compartment is open;
    wherein each of the two folding wall panels adjacent the open side of the upper compartment has a horizontal fold inward midway of its height; and
    wherein the remaining folding wall panel has a horizontal fold outward midway of its height and two diagonal folds inward, each extending from a corner of the wall panel to a diagonally opposite corner.

2. The pet sanitary station of claim 1, further comprising a rectangular support flap, joined along a joining edge to an edge of the side of the lower compartment which is below the open side of the upper compartment, which can be folded along the joining edge into the upper compartment to press outward on the two adjacent wall panels for supporting the two adjacent wall panels in an upright position.

* * * * *